United States Patent
Kawase

(10) Patent No.: US 10,220,519 B2
(45) Date of Patent: Mar. 5, 2019

(54) CONTACT CONTROL DEVICE

(71) Applicant: Azbil Corporation, Chiyoda-ku (JP)

(72) Inventor: Shigeru Kawase, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 117 days.

(21) Appl. No.: 15/521,730

(22) PCT Filed: Oct. 9, 2015

(86) PCT No.: PCT/JP2015/078781
§ 371 (c)(1),
(2) Date: Apr. 25, 2017

(87) PCT Pub. No.: WO2016/067901
PCT Pub. Date: May 6, 2016

(65) Prior Publication Data
US 2017/0239817 A1 Aug. 24, 2017

(30) Foreign Application Priority Data

Oct. 28, 2014 (JP) .................................. 2014-219522

(51) Int. Cl.
| | |
|---|---|
| G05B 19/18 | (2006.01) |
| B25J 13/08 | (2006.01) |
| G05D 13/62 | (2006.01) |
| G05B 11/36 | (2006.01) |
| G05B 13/02 | (2006.01) |
| G05B 11/38 | (2006.01) |
| B25J 9/16 | (2006.01) |

(52) U.S. Cl.
CPC ........... *B25J 13/085* (2013.01); *B25J 9/1633* (2013.01); *B25J 9/1689* (2013.01); *G05B 11/36* (2013.01); *G05B 11/38* (2013.01); *G05B 13/02* (2013.01); *G05D 13/62* (2013.01); *G05B 2219/36455* (2013.01)

(58) Field of Classification Search
None
See application file for complete search history.

(56) References Cited

FOREIGN PATENT DOCUMENTS

| | | |
|---|---|---|
| JP | 5-80856 A | 4/1993 |
| JP | 2001-27902 A | 1/2001 |
| JP | 3472671 B2 | 12/2003 |
| JP | 2010-182084 A | 8/2010 |
| JP | 2013-240858 A | 12/2013 |

OTHER PUBLICATIONS

International Search Report dated Nov. 2, 2015 in PCT/JP2015/078781 filed Oct. 9, 2015.

*Primary Examiner* — Bhavesh V Amin
(74) *Attorney, Agent, or Firm* — Oblon, McClelland, Maier & Neustadt, L.L.P.

(57) ABSTRACT

A contact control device (100) includes a disturbance correction timing control unit (42) that selectively outputs a first reference speed signal indicating a first reference speed or a second reference speed signal indicating a second reference speed lower than the first reference speed. When a movable part (12) comes closer to a second component (B) beyond a first reference position between a fixed part (11) and the second component (B), the disturbance correction timing control unit (42) switches its output signal from the first reference speed signal to the second reference speed signal and switches a gain in proportional compensation from a first gain to a second gain lower than the first gain.

3 Claims, 4 Drawing Sheets

CONTACT CONTROL DEVICE

TECHNICAL FIELD

The present invention relates to a component assembly device that performs component assembly and so on, and specifically relates to a contact control device that controls contact between components or between a component and a workpiece.

BACKGROUND ART

Currently, an industrial robot is often used as a component assembly device that performs component assembly and so on. In an industrial robot that performs component assembly, an end effector, such as a hand, is provided at the end of the robot's arm for performing operations, such as gripping and pushing a component or a workpiece, to thereby perform component assembly.

Operations of a robot are generally controlled in accordance with position control. Therefore, in a case where a pre-programmed position of a component is different from the actual position of the component, contact between the component and another component or between the component and a workpiece produces a large force, which causes scratches or damage to the component.

As a measure against such a problem, a jig (namely, "buffer") that absorbs the force produced due to the error in the position of the component may be separately installed. The buffer is required to have different properties depending on the form or material of the component. Therefore, different buffers need to be prepared for the number of types of components and to be individually designed, which is a disadvantage in terms of cost. Further, the apparatus becomes large, which is a problem.

There may be a case where a force sensor is installed between a robot and a hand and, when an excessive force is almost produced upon contact, the result of sensing by the force sensor is fed back for position control of the robot to thereby prevent the excessive force from being produced. In this case, a buffer is not necessary; however, the force sensor is expensive, which is a problem.

Further, an existing component assembly device constituted by a single robot has a problem, that is, has difficulty in reducing the work time for the following reasons. A force produced upon contact is the sum of an impact force arising from inertia and a force produced by the robot upon contact. The impact force arising from inertia is proportional to the product of the weight of the component and the movable part of the robot and the movement speed. In general, a robot has a large and heavy mechanism, and therefore, the movement speed immediately before contact needs to be decreased to reduce the impact force arising from inertia.

In the case where the force sensor is installed in the robot, an excessive force produced upon contact is sensed and the operation is stopped. However, the robot having a large and heavy movable part and a deceleration mechanism with a backlash is unable to make a sudden stop, and therefore, it is difficult to accelerate a response of force control. Accordingly, in order to reduce a force applied to the component upon contact, the speed at which the component is brought closer needs to be further decreased. As a result, the work time becomes long, which is a problem.

Some component assembly devices, such as "mounters", are capable of performing faster assembly. However, mounters are dedicated machines specializing in fast mounting of small and light components, are not usable in assembly of components other than small and light components, and are relatively expensive apparatuses.

A robot can be used as a component assembly device to thereby increase versatility; however, the above-described problems exist.

CITATION LIST

Patent Literature

PTL 1: Japanese Patent No. 3472671

SUMMARY OF INVENTION

Technical Problem

PTL 1 discloses a technique for allowing a probe assembly provided in an actuator to softly come into contact with a work surface by controlling the speed of movement of the probe assembly. However, it is not possible to sufficiently reduce a force produced upon contact by simply decreasing the speed at which the probe assembly comes into contact with the work surface, which is a problem.

The present invention is made in order to solve the above-described problems, and an object thereof is to provide a contact control device for realizing a component assembly device that allows an assembly target component to quickly come into contact with another component, for example, without causing damage and that includes a low-cost and highly versatile actuator.

Solution to Problem

A contact control device according to the present invention is a contact control device provided in a component assembly device including an actuator for controlling contact of a component, the contact control device including: a position detector that detects a position of a movable part relative to a fixed part of the actuator; a disturbance correction timing control unit that selectively outputs a first reference speed signal indicating a first reference speed or a second reference speed signal indicating a second reference speed lower than the first reference speed in accordance with a position signal output from the position detector; a disturbance correction unit that performs proportional compensation and integral compensation for a difference between a speed signal indicating a movement speed of the movable part relative to the fixed part and the first reference speed signal or a difference between the speed signal and the second reference speed signal; and a driver that linearly or rotationally moves the movable part in accordance with an output signal from the disturbance correction unit. When the movable part comes closer to the component beyond a first reference position between the fixed part and the component, the disturbance correction timing control unit switches an output signal thereof from the first reference speed signal to the second reference speed signal and switches a gain in the proportional compensation from a first gain to a second gain lower than the first gain.

Advantageous Effects of Invention

The contact control device according to the present invention can be used to realize a component assembly device that allows an assembly target component to quickly come into contact with another component, for example, without causing damage and that includes a low-cost and highly versatile actuator.

DESCRIPTION OF EMBODIMENTS

Hereinafter, an embodiment of the present invention will be described with reference to the attached drawings in order to give a detailed description of the present invention.

First Embodiment

A contact control device and a component assembly device according to a first embodiment of the present invention are described with reference to FIG. 1 and FIG. 2.

Figure 1:
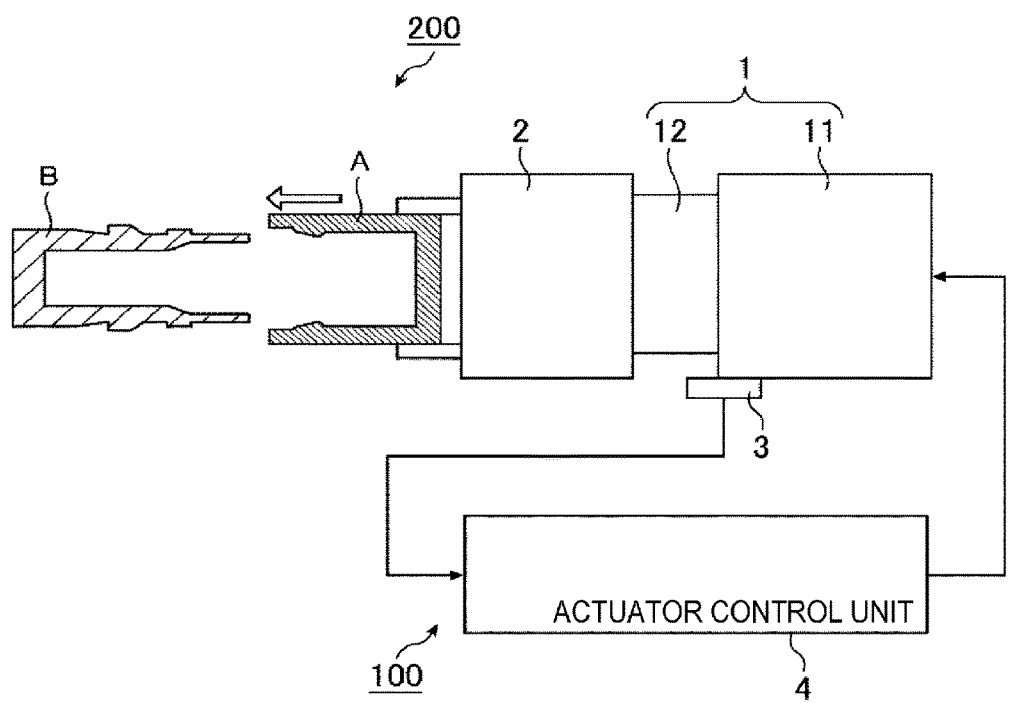
FIG. 1 is an explanatory diagram illustrating a configuration of a contact control device and a component assembly device according to a first embodiment of the present invention.
Figure 2:
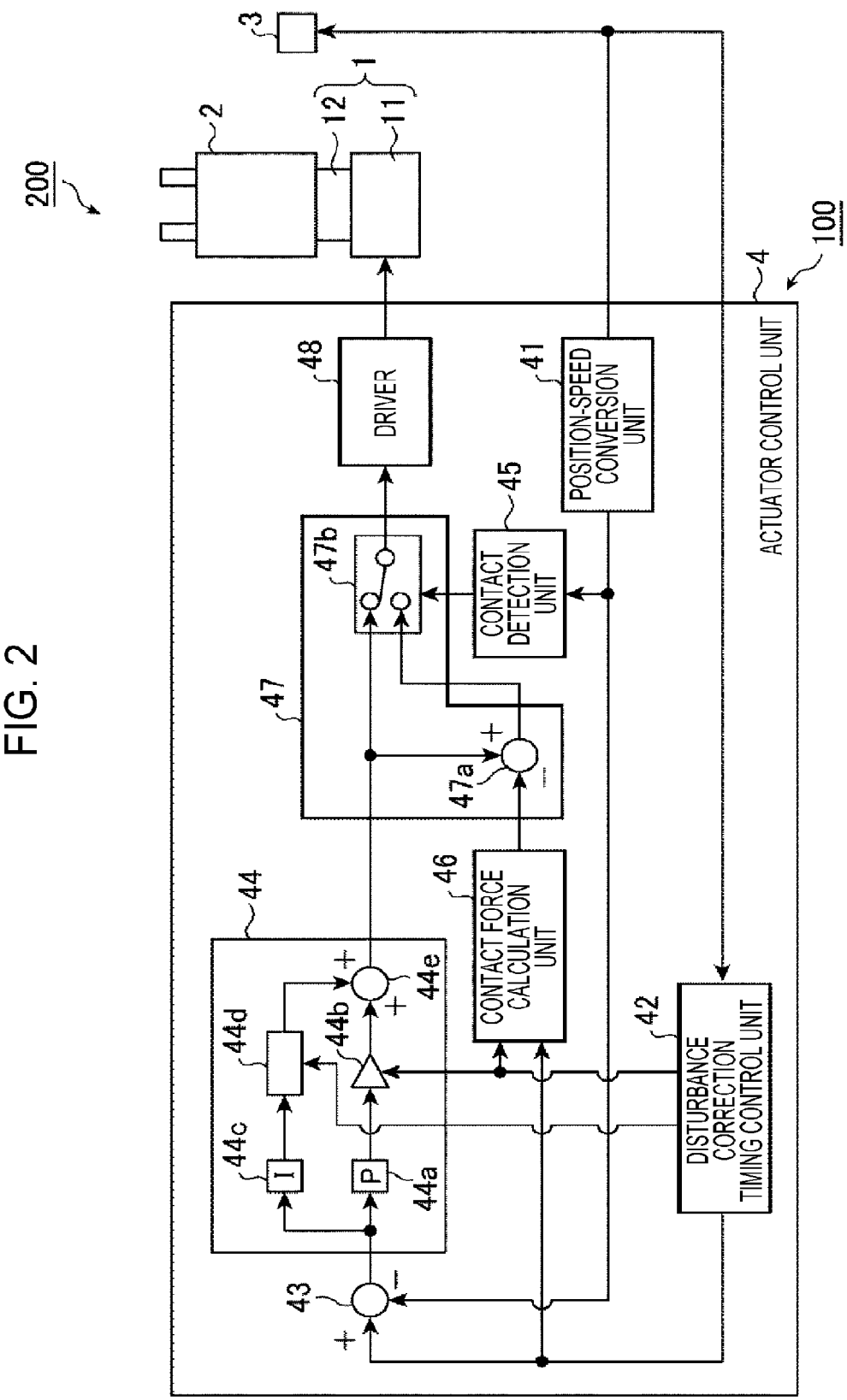
FIG. 2 is an explanatory diagram illustrating a configuration of a main part of the contact control device and the component assembly device according to the first embodiment of the present invention.

In FIG. 1 and FIG. 2, the reference numeral 1 indicates an actuator. The actuator 1 linearly moves a movable part 12 relative to a fixed part 11.

A gripper 2 is attached to the movable part 12 of the actuator 1. The gripper 2 is formed so as to be capable of gripping a first component A, which is an assembly target. The gripper 2 is capable of pushing the first component A against a second component B by linear movement performed by the actuator 1.

A position detector 3 is provided in the actuator 1. The position detector 3 detects the position of the movable part 12 relative to the fixed part 11 in a direction of the linear movement. The position detector 3 outputs a position signal indicating the detected position.

A position-speed conversion unit 41 differentiates the position signal output from the position detector 3 and converts the position signal to a speed signal. The speed signal indicates the movement speed of the movable part 12 relative to the fixed part 11.

A disturbance correction timing control unit 42 selectively outputs a signal (hereinafter referred to as "first reference speed signal") indicating a first reference speed or a signal (hereinafter referred to as "second reference speed signal") indicating a second reference speed lower than the first reference speed in accordance with the position signal output from the position detector 3. The disturbance correction timing control unit 42 switches its output signal from the first reference speed signal to the second reference speed signal in a case where the movable part 12 moves beyond a predetermined reference position (hereinafter referred to as "first reference position") between the fixed part 11 and the second component B and comes closer to the second component B.

Here, the second reference speed is set to a low speed such that in a case where an object that includes the movable part 12 and the gripper 2 and that has a mass M moves at a speed V to bring the first component A into contact with the second component B at a predetermined location, a force produced by the kinetic momentum and energy of the movable part 12 is at a level that does not cause damage to the first component A and the second component B.

The first reference position is set to a position slightly (about 1 mm) short of a position (hereinafter referred to as "contact position") of the movable part 12 at which the first component A comes into contact with the second component B. As a result, in a case where the first component A is brought into contact with the second component B, the distance over which the movable part 12 moves at the second reference speed, which is the lower speed, is reduced, and the work time can be reduced accordingly.

A first subtracter 43 calculates a difference (hereinafter referred to as "speed difference") between the value of the speed signal output from the position-speed conversion unit 41 and the value of the first reference speed signal or the second reference speed signal output from the disturbance correction timing control unit 42.

A proportional compensator 44a performs "proportional compensation (P compensation)" for the speed difference calculated by the first subtracter 43. A gain controller 44b controls a gain in proportional compensation performed by the proportional compensator 44a. The gain controller 44b switches the gain between a first gain and a second gain lower than the first gain in accordance with a control signal from the disturbance correction timing control unit 42.

An integral compensator 44c performs "integral compensation (I compensation)" for the speed difference calculated by the first subtracter 43. A sample-hold 44d selectively performs an operation (hereinafter referred to as "sample operation") of letting an output signal from the integral compensator 44c pass therethrough or an operation (hereinafter referred to as "hold operation") of holding an output signal from the integral compensator 44c. The sample-hold 44d switches its operation between the sample operation and the hold operation in accordance with a control signal from the disturbance correction timing control unit 42.

An adder 44e adds an output signal from the gain controller 44b and an output signal from the sample-hold 44d together. The proportional compensator 44a, the gain controller 44b, the integral compensator 44c, the sample-hold 44d, and the adder 44e constitute a disturbance correction unit 44. The disturbance correction unit 44 provides a function of "PI compensator" in a case where the sample-hold 44d performs the sample operation.

A contact detection unit 45 detects contact between the first component A and the second component B by using the speed signal output from the position-speed conversion unit 41. That is, the contact detection unit 45 determines that the first component A comes into contact with the second component B in a case where the value of the speed signal output from the position-speed conversion unit 41 remains within a predetermined range including zero at its center for a preset period.

A contact force calculation unit 46 calculates the magnitude of a force produced by the actuator out of a force produced when the first component A comes into contact with the second component B by using the value of the second reference speed and the value of the second gain. The contact force calculation unit 46 subtracts the calculated force produced by the actuator from the output signal from the adder 44e, that is, the force actually produced by the actuator when the contact detection unit 45 detects contact to thereby output a signal that allows a force applied to the components to be reduced.

A second subtracter 47a calculates a difference between the output signal from the adder 44e, that is, the force actually produced by the actuator, and the output signal from the contact force calculation unit 46, that is, the calculated force produced by the actuator. A switch 47b outputs the output signal from the adder 44e to a driver 48. In a case where the contact detection unit 45 detects contact, the switch 47b outputs to the driver 48 an output signal from the second subtracter 47a instead of the output signal from the adder 44e. The second subtracter 47a and the switch 47b constitute a contact force correction unit 47.

The driver 48 linearly moves the movable part 12 of the actuator 1 in accordance with the output signal from the switch 47b and supplies to the actuator a current proportional to the signal input thereto. The position-speed conversion unit 41, the disturbance correction timing control unit 42, the first subtracter 43, the disturbance correction unit 44, the contact detection unit 45, the contact force calculation unit 46, the contact force correction unit 47, and the driver 48 constitute an actuator control unit 4. The position detector 3 and the actuator control unit 4 constitute a contact control device 100. The actuator 1, the gripper 2, and the contact control device 100 constitute a component assembly device 200.

Figure 3:
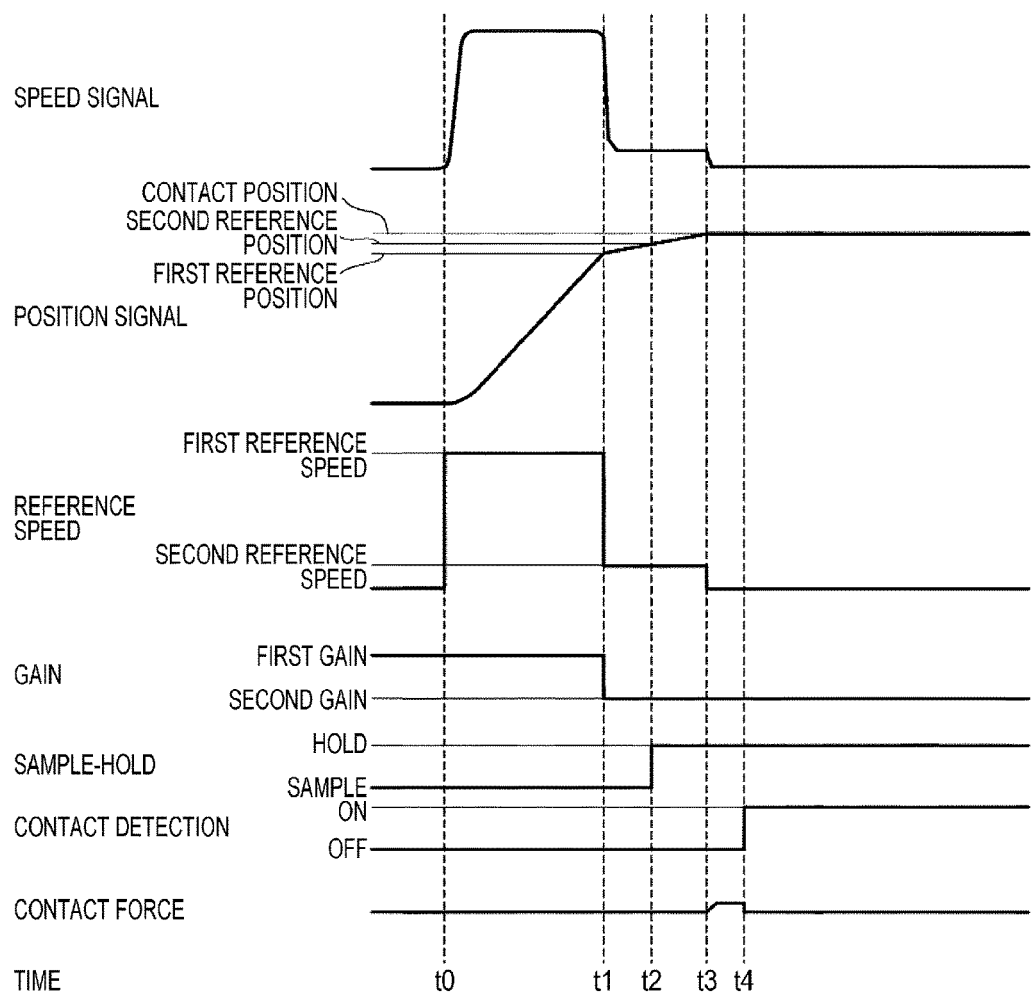
FIG. 3 is an explanatory diagram illustrating operations of the contact control device and the component assembly device according to the first embodiment of the present invention.

Now, operations of the contact control device 100 and the component assembly device 200 are described with reference to the timing chart in FIG. 3.

Here, it is assumed that, in the initial state, the movable part 12 of the actuator 1 is located in the vicinity of the fixed part 11 and that the first component A, which is gripped by the gripper 2, is located at a position sufficiently apart from the second component B, which is a contact target.

First, at time t0, a controller not illustrated outputs to the actuator control unit 4 an instruction signal indicating an instruction for starting a contact operation. The disturbance correction timing control unit 42 sets the gain of the gain controller 44b to the first gain and instructs the sample-hold 44d to perform the sample operation. A control system (hereinafter referred to as "speed control system") constituted by the position-speed conversion unit 41, the disturbance correction timing control unit 42, the first subtracter 43, the disturbance correction unit 44, the switch 47b, and the driver 48 is able to preform stable speed control because of PI compensation performed by the disturbance correction unit 44 even if a disturbance, such as tension of a wire connected to the movable part 12, occurs.

The disturbance correction timing control unit 42 outputs the first reference speed signal to the first subtracter 43. Accordingly, the movable part 12 of the actuator 1 moves the first component A at a high speed so as to bring the first component A closer to the second component B.

Subsequently, when the movable part 12 moves the first component A so as to bring the first component A closer to the second component B and an output signal from the position detector 3 is beyond the first reference position at time t1, the disturbance correction timing control unit 42 switches a signal to be output to the first subtracter 43 from the first reference speed signal to the second reference speed signal. At the same time, the disturbance correction timing control unit 42 switches the gain of the gain controller 44b from the first gain to the second gain.

When the output signal from the disturbance correction timing control unit 42 is switched to the second reference speed signal, which indicates the lower speed, an impact force produced by the kinetic momentum and energy of the object that includes the movable part 12 and the gripper 2 and that has a mass M upon contact between the first component A and the second component B is reduced. Accordingly, it is possible to protect the first component A and the second component B from damage.

Specifically, an actuator used to assemble small components is typically at least an order of magnitude lighter than a robot. Therefore, if the speed upon contact is the same, the impact force becomes an order of magnitude smaller.

Further, if the impact force is the same, the speed upon contact can be significantly increased.

When the output signal from the disturbance correction timing control unit 42 is switched to the second reference speed signal, which indicates the lower speed, and the gain of the gain controller 44b is switched to the second gain, which is the lower gain, a force produced by the actuator upon contact between the first component A and the second component B can be reduced by the speed control system. This is because the magnitude of the produced force is made proportional to the magnitude of the loop gain of the speed control system and the magnitude of the reference speed signal by the speed control system, which is described below.

Now, the magnitude of a force produced by the actuator upon contact, which is controlled by the speed control system, is described with reference to FIG. 4.

Figure 4:
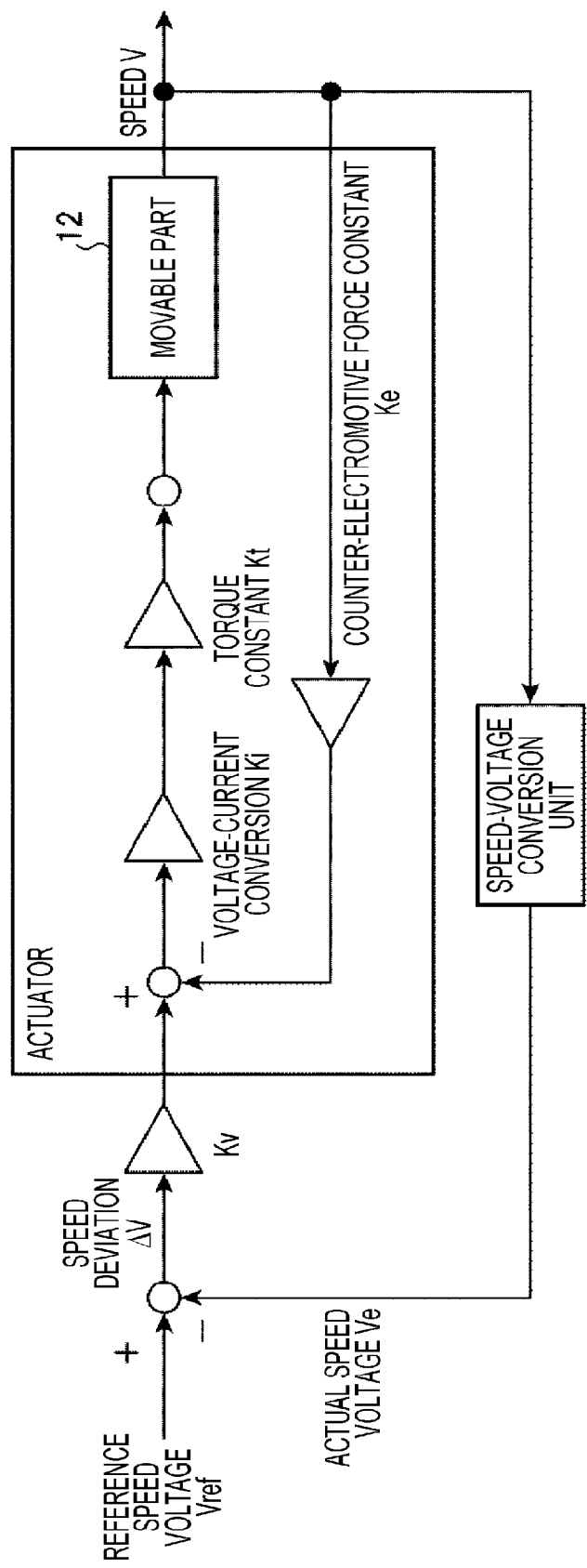
FIG. 4 is an explanatory diagram illustrating an equivalent model of a speed control system.

FIG. 4 illustrates an equivalent model of the speed control system. In the speed control system in FIG. 4, a thrust F2 produced in a case where the movable part 12 moves at a speed V (a force applied to the first component A) is expressed by Equation (1) below.

$$F2 = Kt \cdot Ki \cdot (Kv \cdot \Delta V - KeV) \qquad (1)$$
$$= Kt \cdot Ki \cdot (Kv \cdot (Vref - Ve) - KeV)$$

In a case where the first component A comes into contact with the second component B and is stopped, the actual speed voltage Ve is equal to 0 and the speed V is equal to 0. The thrust F2 in this state has a value proportional to the reference speed voltage Vref as expressed by Equation (2) below.

$$F2 = Kt \cdot Ki \cdot Kv \cdot Vref \qquad (2)$$

At this time, the second component B is subjected to an opposing force F1 having the same magnitude as that of the thrust F2. Therefore, as long as the reference speed voltage Vref and the loop gain Kt·Ki·Kv are set to sufficiently low values, the first component A can be in contact with the second component B with a very small force and be kept in this state.

At time t1, the gain of the gain controller 44b is switched to the second gain lower than the first gain; however, the sample-hold 44d continues performing the sample operation. Therefore, although responsivity to a disturbance change becomes slightly lower after time t1 than that before time t1, the disturbance correction unit 44 operates so as to cancel out an effect produced by a disturbance. The speed control system operates so as to make the movement speed of the movable part 12 equal to the second reference speed, and therefore, the movement speed of the movable part 12 is maintained at a low speed.

Subsequently, at time t2, the movable part 12 moves beyond a position (hereinafter referred to as "second reference position") between the first reference position and the contact position and just short of a position at which the first component A is likely to come into contact with the second component B. Then, the disturbance correction timing control unit 42 switches the operation of the sample-hold 44*d* from the sample operation to the hold operation.

After time t2, the sample-hold 44*d* holds an output value from the integral compensator 44*c* at time t2. The gain of the gain controller 44*b* remains unchanged and is the second gain lower than the first gain, and the reference speed remains unchanged and is the second reference speed, which is the lower speed. Accordingly, the speed control system is a proportional control system in which the reference speed is set to the lower speed and is able to reduce a force produced upon contact.

In general, if the loop gain of the speed control system is set to a low value, the operation is susceptible to a disturbance, which is a problem. As a measure against this problem, the sample-hold 44*d* continues performing the sample operation even after the gain was switched to the second gain at time t1 until the movable part 12 moves beyond the second reference position at time t2. Accordingly, even after the gain has been decreased, the integral operation continues until the first component A is likely to come into contact with the second component B, and a state in which the effect of a disturbance is canceled out is created.

The second reference position is set to a position just short of the position (contact position) of the movable part 12 at which the first component A comes into contact with the second component B by taking into consideration an error of the absolute position of the second component B and that of the movable part 12. Therefore, the distance between the second reference position and the contact position is sufficiently short, and the traveling time from when the movable part 12 moves beyond the second reference position until when the movable part 12 reaches the contact position is about several tens of milliseconds (ms).

Accordingly, a rapid and significant change in a disturbance during a period from when the sample-hold 44*d* is made to enter the hold state until when the first component A comes into contact with the second component B does not take place, and the effect of the disturbance is at a level that does not require attention.

Subsequently, at time t3, the first component A comes into contact with the second component B.

The contact speed at this time is set to the lower speed as described above, and a force applied by the actuator to the components upon contact is reduced accordingly.

As a result, the movable part 12 is stopped with a very small force upon contact. Therefore, the value of the position signal remains constant, and the value of the speed signal is nearly equal to zero. At this timing, the disturbance correction timing control unit 42 changes the value of the reference speed signal to zero. If the value of the speed signal remains within a range that includes zero for a predetermined time, then the contact detection unit 45 detects contact between the first component A and the second contact B at time t4.

After time t3, the speed signal is nearly equal to zero, and the reference speed signal is equal to zero. However, a very small contact force that is unable to be canceled out by the speed control system is produced between the first component A and the second component B due to a value having been held by the sample-hold 44*d* since time t2.

Accordingly, the contact force calculation unit 46 calculates in advance the magnitude of a force produced by the actuator out of a force produced when the first component A comes into contact with the second component B by using the value of the second reference speed and the value of the second gain. The contact force calculation unit 46 subtracts the calculated force from the output signal from the adder 44*e* to thereby output a signal that allows a force applied to the components to be reduced.

When the contact detection unit 45 detects contact at time t4, the switch 47*b* performs switching to output to the driver 48 an output signal from the second subtracter 47*a*. Accordingly, a very small contact force that is unable to be canceled out by the speed control system can be canceled out, and the contact force between the first component A and the second component B can be further reduced.

As described above, the contact control device 100 according to the first embodiment includes the position detector 3, the disturbance correction timing control unit 42, the disturbance correction unit 44, and the driver 48. The position detector 3 detects the position of the movable part 12 relative to the fixed part 11 of the actuator 1. The disturbance correction timing control unit 42 selectively outputs the first reference speed signal indicating the first reference speed or the second reference speed signal indicating the second reference speed lower than the first reference speed in accordance with a position signal output from the position detector 3. The disturbance correction unit 44 performs proportional compensation and integral compensation for a difference between a speed signal indicating the movement speed of the movable part 12 relative to the fixed part 11 and the first reference speed signal or the second reference speed signal. The driver 48 drives the movable part 12 in accordance with an output signal from the disturbance correction unit 44. The disturbance correction timing control unit 42 switches its output signal from the first reference speed signal to the second reference speed signal and switches the gain in proportional compensation from the first gain to the second gain lower than the first gain when the movable part 12 comes closer to the second component B beyond the first reference position between the fixed part 11 and the second component B. The first reference position is set to a position slightly short of the contact position to thereby reduce the distance over which the movable part 12 moves at the second reference speed, which is the lower speed, and to reduce the work time accordingly. Both the value of the reference speed signal and the value of the gain are made lower to thereby reduce a force produced upon contact between the first component A and the second component B.

The disturbance correction timing control unit 42 causes the sample-hold 44*d* to hold the value from the integral operation when the movable part 12 comes closer to the second component B beyond the second reference position between the first reference position and the second component B. Even after the gain in proportional compensation has been decreased, the integral operation continues until the first component A is likely to come into contact with the second component B to thereby create a state where the effect of a disturbance is canceled out. The distance between the second reference position and the contact position is sufficiently short, and therefore, the effect of a disturbance during a period from when the sample-hold 44*d* is made to enter the hold state until when the first component A comes into contact with the second component B does not require attention.

Further, the contact control device 100 includes the contact detection unit 45, the contact force calculation unit 46, and the contact force correction unit 47. The contact detection unit 45 detects contact between the first component A and the second component B by using a speed signal. The contact force calculation unit 46 calculates the magnitude of a force produced when the first component A comes into contact with the second component B by using the value of the second reference speed and the value of the second gain, and outputs a signal corresponding to the calculated force. The contact force correction unit 47 outputs to the driver 48 a signal obtained by subtracting the output signal from the contact force calculation unit 46 from an output signal from the disturbance correction unit 44 when the contact detection unit 45 detects contact between the first component A and the second component B. When the first component A comes into contact with the second component B, a very small contact force that is unable to be canceled out by the speed control system is canceled out to thereby further reduce the force produced upon contact between the first component A and the second component B.

The contact control device 100 according to the first embodiment does not require a buffer or a force sensor, and therefore, the component assembly device 200 can be provided at a low cost. Further, the component assembly device 200 that is highly versatile can be provided in accordance with the type of end effector, such as the gripper 2.

The movable part 12 of the actuator 1 may be provided with a soldering iron or other tools instead of the gripper 2. The contact control device 100 may control contact between the soldering iron provided on the movable part 12 and a soldering target portion of the second component B.

The actuator 1 may push the first component A, which is gripped by the gripper 2, against a jig instead of the second component B, and the contact control device 100 may control contact between the first component A and the jig.

A speed detector instead of the position-speed conversion unit 41 may be provided to detect the movement speed of the movable part 12 relative to the fixed part 11 and to output a speed signal indicating the detected movement speed.

The actuator 1 may rotationally move the movable part 12 relative to the fixed part 11.

In the present invention, any constituent element in the embodiment may be modified or any constituent element in the embodiment may be omitted within the scope of the invention.

INDUSTRIAL APPLICABILITY

The contact control device according to the present invention can be used to control an industrial robot, for example, that performs component assembly.

REFERENCE SIGNS LIST

1 actuator
2 gripper
3 position detector
4 actuator control unit
11 fixed part
12 movable part
41 position-speed conversion unit
42 disturbance correction timing control unit
43 first subtracter
44 disturbance correction unit
44*a* proportional compensator
44*b* gain controller
44*c* integral compensator
44*d* sample-hold
44*e* adder
45 contact detection unit
46 contact force calculation unit
47 contact force correction unit
47*a* second subtracter
47*b* switch
48 driver
100 contact control device
200 component assembly device
A first component
B second component

The invention claimed is:

1. A contact control device provided in a component assembly device including an actuator for controlling contact of a component, the contact control device comprising:
a position detector that detects a position of a movable part relative to a fixed part of the actuator;
a disturbance correction timing control unit that selectively outputs a first reference speed signal indicating a first reference speed or a second reference speed signal indicating a second reference speed lower than the first reference speed in accordance with a position signal output from the position detector;
a disturbance correction unit that performs proportional compensation and integral compensation for a difference between a speed signal indicating a movement speed of the movable part relative to the fixed part and the first reference speed signal or a difference between the speed signal and the second reference speed signal; and
a driver that linearly or rotationally moves the movable part in accordance with an output signal from the disturbance correction unit, wherein
when the movable part comes closer to the component beyond a first reference position between the fixed part and the component, the disturbance correction timing control unit switches an output signal thereof from the first reference speed signal to the second reference speed signal and switches a gain in the proportional compensation from a first gain to a second gain lower than the first gain.

2. The contact control device according to claim 1, wherein
the disturbance correction timing control unit causes a value from an integral operation in the integral compensation to be held when the movable part comes closer to the component beyond a second reference position between the first reference position and the component.

3. The contact control device according to claim 2, further comprising:
a contact detection unit that detects contact of the component by using the speed signal;
a contact force calculation unit that calculates a magnitude of a force produced by the actuator upon contact of the component by using a value of the second gain and a value of the second reference speed and outputs a signal corresponding to the calculated force; and
a contact force correction unit that outputs to the driver a signal obtained by subtracting the signal output from the contact force calculation unit from the output signal from the disturbance correction unit when the contact detection unit detects contact of the component.

* * * * *